Aug. 12, 1941.   D. C. ROCKOLA   2,252,035
PARKING METER
Filed May 14, 1937   3 Sheets-Sheet 1
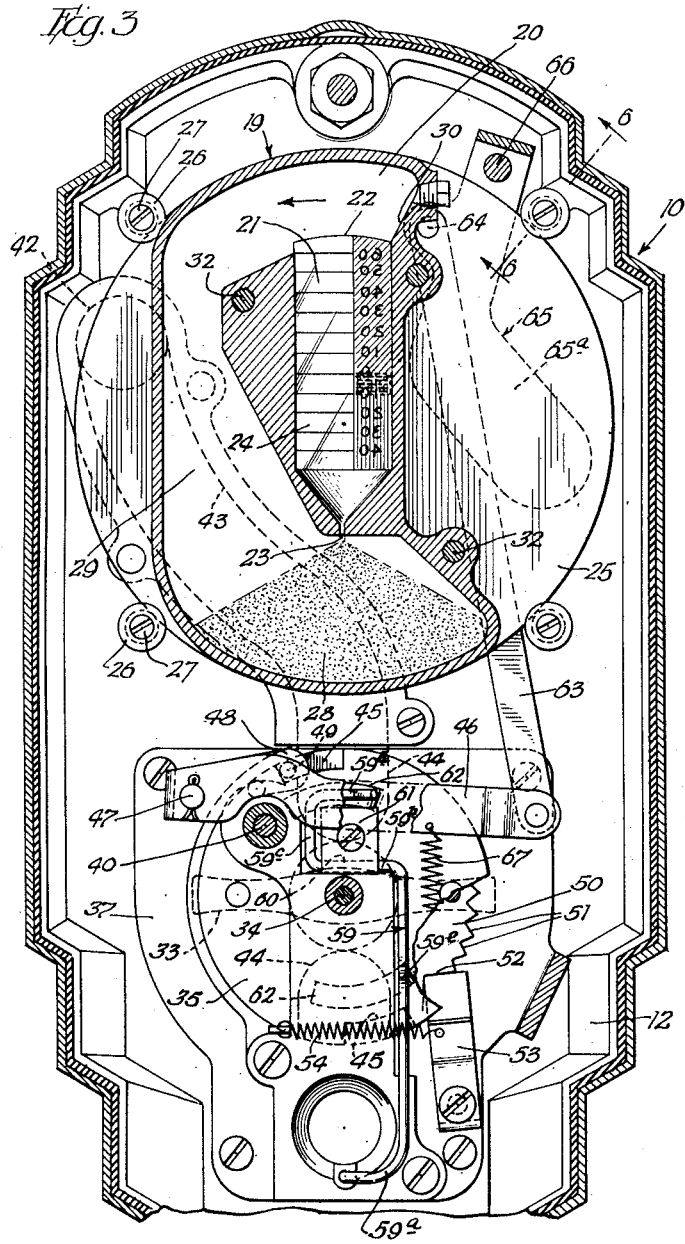
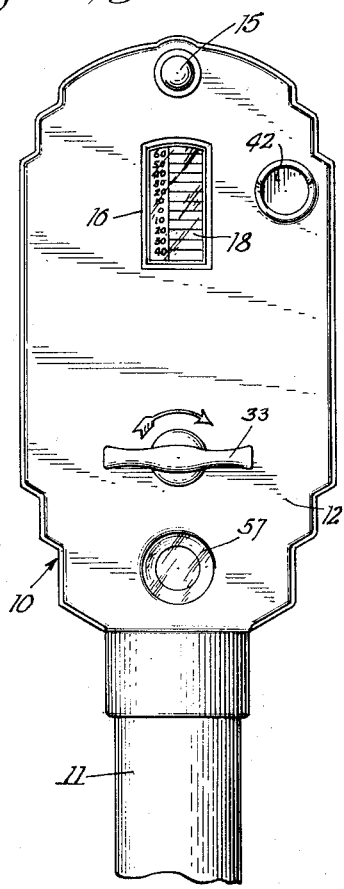
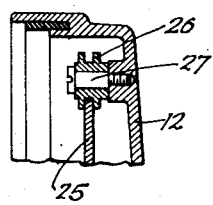
Inventor
David C. Rockola
BY
Sheridan, Davis & Cargill
Attorneys

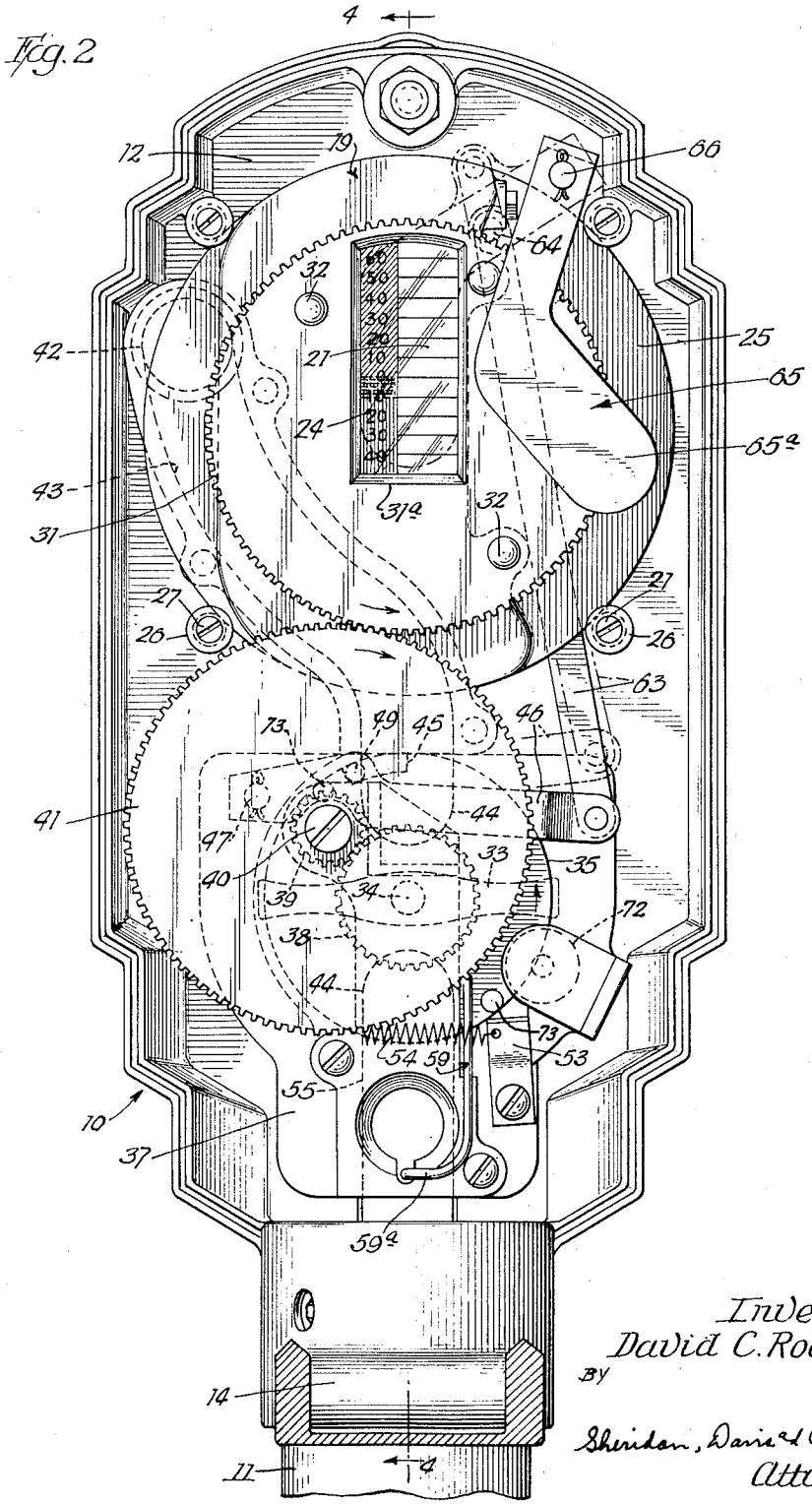

Aug. 12, 1941.    D. C. ROCKOLA    2,252,035
PARKING METER
Filed May 14, 1937    3 Sheets-Sheet 3
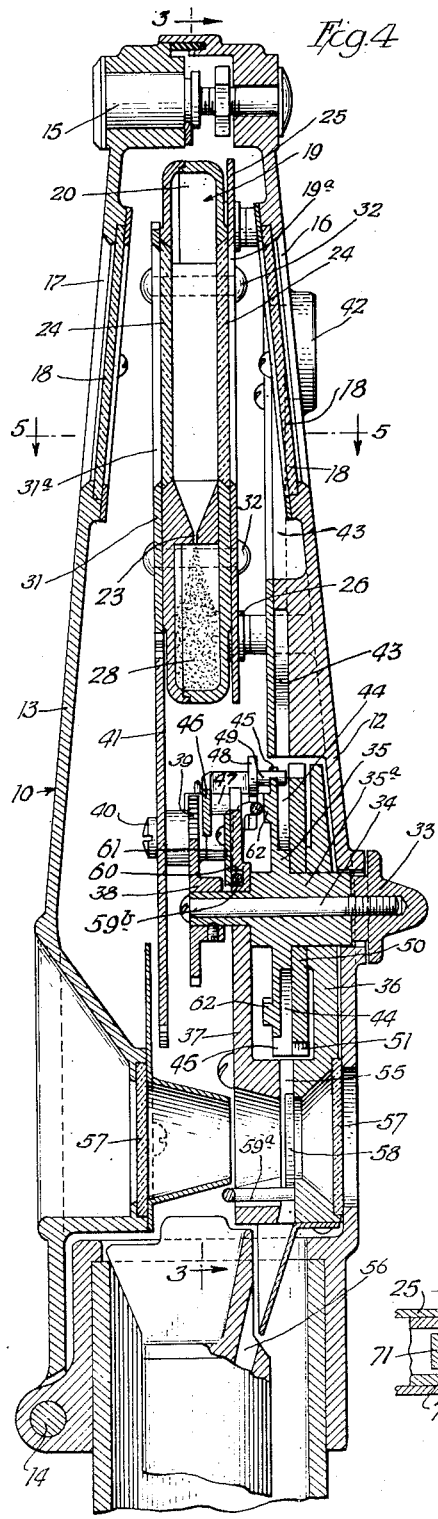
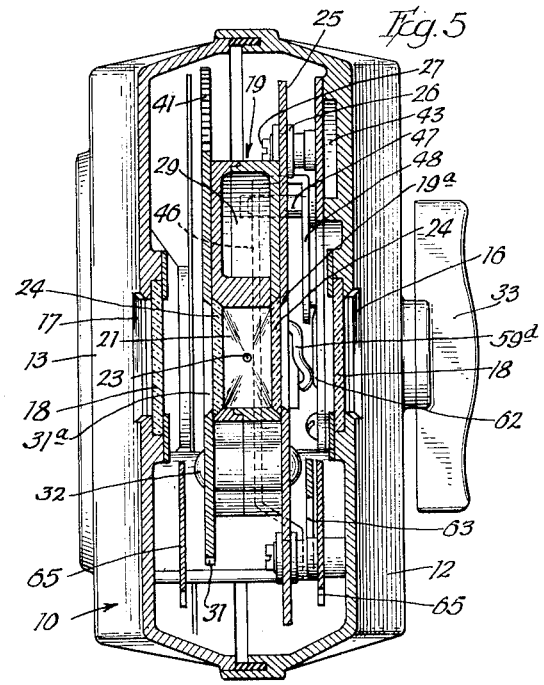
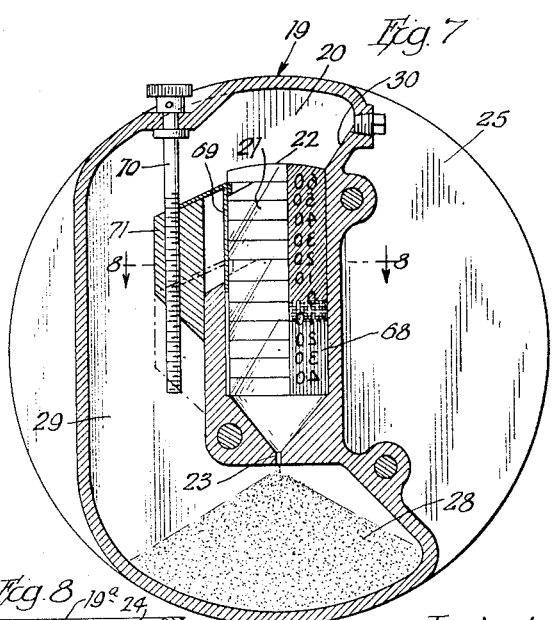
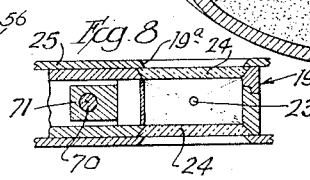
Inventor
David C. Rockola
BY
Sheridan, Davis and Cargell
Attorneys Patented Aug. 12, 1941

2,252,035

UNITED STATES PATENT OFFICE 2,252,035

PARKING METER

David C. Rockola, Chicago, Ill., assignor to National Park-O-Graf Corporation, Chicago, Ill., a corporation of Illinois Application May 14, 1937, Serial No. 142,551

2 Claims. (Cl. 161—15)

This invention relates to improvements in parking meters.

Parking meters as heretofore made generally have been provided with clock mechanism for operating the parking period indicators. Some such indicators have been arranged for indicating not only the parking period but also a permissible overtime parking period and also an overtime parking period. Such a meter is shown in my copending application, Serial No. 71,088, filed March 27, 1936, Patent No. 2,171,345 granted on August 29, 1939. The parking period indicating mechanisms usually have been restored to a given position at the beginning of a parking period by means of a manually operable exterior lever or handle after insertion of a token or coin, which lever operates a winding or energizing means for the timing mechanism.

By means of the present improvements, conventional clock work or escapement mechanism for actuating the indicator has been omitted and a timer utilizing dry pulverulent material such as sand or other suitable flowable or mobile material is employed so that the timing of the period or periods to be indicated by the meter is effected by making use of the principles of an hour glass.

The present invention thus eliminates use of relatively delicate and expensive clock mechanism which, when subjected to various extremes of temperatures and other weather conditions or to rough usage by patrons and others, may become inaccurate, thus giving cause for complaints by patrons if the indicated parking periods have been less than intended or cause loss in revenue to the municipality or other proprietors if the meters should become inoperable or the periods indicated by the meters should be longer than intended.

By utilizing the principles of an hour glass in a timing mechanism, the flowable or mobile material of which can be sealed in a container against moisture and the timing action of which is not affected materially by temperature changes, a reliable parking meter has been provided.

One object of the present improvements is to provide a parking meter having an "hour glass" timing means and coin controlled mechanism for initiating the operation of the timing means at the beginning of a parking period.

Another object of the invention is to provide a parking meter having a combined timing device and parking period indicator comprising a receptacle for sand or other mobile material which is operable to effect the automatic replenishment of the receptacle at the beginning of a parking period by the manual operation of a coin-freed mechanism.

An additional object of the invention is to provide a parking meter having an hour glass timer and indicator receptacle which is rotatable through a predetermined arc to replenish the receptacle at the beginning of a parking period and means for shielding the receptacle from view during such rotation and until the same and associated mechanism shall have been properly restored to normal operative position.

A further object of the invention is to provide a parking meter having timing means employing the principles of an hour glass and which means can be adjusted for varying the indicated period preferably without altering the original quantity of such material with which the container therefor shall have been charged.

Other objects of the invention relate to various features of construction and arrangement of parts which will be apparent from a consideration of the following specification and accompanying drawings, wherein—

Fig. 1 is a front elevation of a parking meter embodying the present improvements;

Fig. 2 is an elevation on an enlarged scale of the parking meter but with the rear casing section removed;

Fig. 3 is a vertical section taken on line 3—3 of Fig. 4, parts of the mechanism being broken away for the purpose of clarity;

Fig. 4 is a vertical section taken on line 4—4 of Fig. 2;

Fig. 5 is a section taken on line 5—5 of Fig. 4;

Fig. 6 is a broken sectional view taken on line 6—6 of Fig. 3;

Fig. 7 is a vertical sectional view through a modified form of indicator; and

Fig. 8 is a sectional view taken on line 8—8 of Fig. 7.

In the drawings, the parking meter mechanism is shown housed in a casing 10 which may be mounted upon a suitable post or pillar 11 in the usual manner. The casing 10 comprises a front section 12 and a rear section 13 which are hingedly secured together adjacent the lower ends thereof as at 14 which permit access to the interior of the casing upon releasing a lock 15 at the upper end of the casing sections. The sections preferably are so constructed at their abutting edges as to form an adequate seal to exclude rain, dust and other foreign matter.

The sections 12 and 13 are provided with aligned sight openings 16 and 17 each provided with a small glass pane 18. A parking period indicator 19 is located in the upper portion of the casing and normally is visible by means of the windows 16 and 17. The indicator 19 comprises a container 20 preferably of the shape in vertical section shown in Fig. 3. The container 20 is provided with a receptacle 21 having an open upper end 22 and a constricted opening 23 at its lower end. The receptacle 21 is provided with window openings in the opposite faces thereof which are closed by panes 24. In the normal position of the indicator, the window openings of the receptacle register with the openings 16 and 17 of the casing sections whereby the interior of the receptacle 21 is visible from either side of the meter.

The receptacle 21 constitutes the "hour glass" of the indicator for timing the parking period and the transparent closure members 24 therefor preferably are provided with indicia for indicating the parking period, a permissible overtime parking period, if desired, as well as an overtime parking period. Thus, as shown in Fig. 1, numerals 60 to 0 indicate a parking period and as illustrated, this section may have a green background. From 0 to the next lower numeral 10, the background may be colored yellow or amber to indicate a permissible overtime parking period while the remainder of the scale may have a red background and constitutes the overtime parking period indicating section of the indicator.

If the receptacle 21 is filled with sand or other mobile material at the beginning of the parking period, it will pass at a predetermined rate through the small port or passage 23 into the lower portion of the container. Thus, the indicia on the meter illustrated in the drawings indicate a parking period of one hour, during which time the level of the material will gradually drop from 60 to 0 as indicated on the scale which, as stated, is visible from either side of the meter.

Means are provided for restoring the material to the receptacle at the beginning of a parking period. In the embodiment of the invention herein disclosed, this material is returned automatically to the receptacle when a patron inserts a proper coin in the meter and operates an exterior knob or handle. The return of the material to the receptacle is effected by rotating the casing 19 by means of mechanism actuated by the above mentioned knob or handle. To enable the casing to be rotatably mounted, a circular disc 25 is secured to the forward face of the casing 19 and is provided with an opening 19a therein which registers with the window opening 24 of the adjacent side of the container so as not to obstruct the latter. The disc 25 constitutes the supporting means for the receptacle 19 and is itself supported by a plurality of channeled rollers 26 carried by studs 27 projecting inwardly from the inner wall of the casing section 12. The periphery of the disc is supported within the channels of the rollers 26, thus leaving the disc free to rotate.

In Fig. 3, the sand or mobile material 28 is shown in a heap in the lower portion of the container. As the container rotates counter-clockwise, this dry material will tend to flow from the lower portion of the container through a passage 29 around the receptacle 21 to that portion of the passage 29 which terminates above the receptacle. Thus, when the container has moved 180° from the position shown in Fig. 3 in the direction of the arrow, the material 28 will be disposed in what in said figure constitutes the upper portion of the passage 29. As the container moves through the remaining 180° of a single rotation, the wall 30 at the end of the passage 29 will direct the material into the receptacle 21 and as the container moves into the original position indicated in Fig. 3, the receptacle will be filled to the level predetermined by the quantity of sand in the container or by other means such as hereinafter described.

Suitable means for operating the container 20 through 360° as just described may comprise a gear 31 which is secured to the rear wall of the container. This gear has an opening 31a therein which registers with the corresponding window 24 of the container 30. As shown in Fig. 4, the windows 24 are beveled at their edges to seat within the beveled edges of the openings in the respective side walls of the container. The disc 25 and also the gear 31 are shown as slightly overlapping the edges of the windows and thus constitute means for holding the windows in place. The disc and gear may be secured to the container 19 by common attaching means such as rivets 32. As stated, the indicator is actuated at the beginning of the parking period preferably by a coin-freed mechanism which may correspond generally with the mechanism disclosed in my copending applications above or hereinafter referred to. This mechanism shown in the drawings has an exterior normally operable knob or handle 33 mounted upon a shaft 34. The shaft extends through and is secured to a hub portion 35a of the disc 35, the hub being journaled in plates 36 and 37 secured to the front casing section 12. The inner end of the hub 35a carries a pinion 38 which drives a gear 39 rotatably mounted on a pin or shaft 40 carried by the plate 37. Also mounted on the shaft 40 is a gear 41 which rotates with the gear 39. Gear 41 meshes with gear 31 as shown in Fig. 4. The knob or handle 33 is designed for operation through an arc of 180° and hence the gears 38 and 39 are of the ratio of two to one so that the rotation of the gear 38 through 180° will effect the rotation of gear 39 as well as gear 41 and gear 31 through an arc of 360°. It will thus be seen that whenever the handle is actuated as above described, the container 19 will be rotated through 360°, during which rotation the material 28 will be restored to the proper level in the receptacle 21.

To prevent the operation of the meter as above described without first inserting a proper token or coin in the machine, coin-freed mechanism is provided. The casing section 12 is provided with a coin receiving opening 42 from which a coin inserted therein descends through a chute 43 to one of two coin recesses 44 provided in the disc 35. Adjacent the respective recesses 44, the disc 35 is also provided with two peripheral slots 45. A lever 46 is pivotally mounted on a pin 47 carried by the supporting plate 37, the pivoted end of the lever being of yoke-like form and having a short arm 48 provided with a forwardly extending pin 49 normally adapted to seat in one or the other of the slots 45 depending on which slot is uppermost. While the pin is in one of the slots 45, it will be seen that the handle and the mechanism operated thereby can be rotated only a distance corresponding to the length of the slot and that while the pin is thus disposed in one of the slots, the mechanism is locked against operation.

With the mechanism in the position shown in Fig. 3, it will be seen that a proper coin inserted in the coin receiving opening 22 will gravitate through the coin passage 43 into the uppermost coin receiving recess 44. The coin, when in said recess, will project slightly above the periphery of the disc 35 and hence should the handle 33 then be operated to turn the disc in a counter-clockwise direction as viewed in Fig. 3, the coin acting as a cam will lift the pin 49 upwardly, thus swinging the lever 46 counter-clockwise. As the coin is carried beneath the pin by the rotation of the disc, the pin will descend upon the periphery of the disc whereby the disc can be rotated through an arc of 180°. During such rotation, the gears 38, 39, 41 and 31 are operated to effect the rotation of the container 19 through 360°, thus filling the receptacle 21 with the material 28.

To permit rotation of the handle 33 in one direction only, a ratchet wheel 50 is provided which is secured to the disc 35. The periphery of the ratchet wheel is provided with ratchet teeth 51 and at vertically opposite points is provided also with enlarged notches 52. A pawl 53 normally seats in one of the two notches 52 and prevents operation of the handle clockwise as viewed in Fig. 3 although it will permit the same limited movement of the disc 35 in the opposite direction which is permitted by the slot 45 into which the pin 49 extends. The ratchet thus does not obstruct the necessary initial movement of the disc 35 in the counter-clockwise direction required in effecting the release of the operating mechanism when a coin has been inserted in the machine. The teeth 50 click by the pawl 53 but prevent movement in the opposite direction after the pin 49 has been cammed from a recess 45. The pawl 53 is provided with a spring 54 which holds it in operative position.

As the patron completes the operation of the handle 33, the coin which he inserted for releasing the mechanism is carried by the receiving recess 44 from the upper position shown in Fig. 3 to the lower position whereupon the coin drops into a registering passage 55 and from said passage it may go into a coin receptacle 56. To discourage the use of spurious coins or tokens in parking meters, it has been found desirable to provide coin arresting and exhibiting means whereby the coin used for operating the meter is retained in a position visible from the exterior of the casing. A suitable coin arresting and exhibiting means is disclosed in my copending application, Serial No. 82,864, filed June 1, 1936. Such means may comprise registering sight openings in the casing sections provided with windows 57 and a coin arresting device which arrests the coin in alignment with said windows. Such a coin in arrested position is shown at 58 in Fig. 4. This arresting device comprises a member 59 of wire or rod-like form having a lower end portion 59a adapted to extend transversely of the passage 55 whereby a coin released from the carrier disc 35 will be arrested as shown at 58 in Fig. 4. The member 59 is provided with a horizontal intermediate section 59b disposed within a transverse slot 60 in the plate 37 and is held in such position by means of a small plate 61. Extending from the portion 59b is a vertical portion 59c which terminates in a horizontal portion 59d. It will thus be seen that the portion 59b constitutes a pivot for the member 59 and that by application of pressure to the portion 59d, the coin arresting portion 59a may be swung to the left as viewed in Fig. 4 out of the passage 55 to permit a coin to fall into the coin receptacle 56. For so operating the member 59, diagonally opposite cams 62 are provided on a face of the disc 35. When the disc 35 is in the position shown in Fig. 3, the uppermost of the cams 62 engages the portion 59d of the coin arresting member 59 and swings the latter counter-clockwise as viewed in Fig. 4, thus holding the portion 59a in the coin arresting position therein shown.

Upon the insertion of another coin and the operation of the coin-freed mechanism as above described, the portion 59d will be freed from the upper cam 62 by rotation of the disc 35 but the other cam 62 will then engage a rearwardly directed portion 59e and swing the member 59 in a clockwise direction as viewed in Fig. 4, thus releasing the coin used in the previous operation of the meter. However, before the coin last inserted in the meter will have been discharged from the carrier disc 35, the same upwardly moving cam 62 which effected the release of the previous coin will have moved to the upper position and will engage the portion 59d and thus again swing the member 59 to the position shown in Fig. 4 for arresting the last mentioned coin in the position shown at 58 as it drops from the inverted coin recess 44.

As above described, the insertion of a proper coin in the machine and the operation of the handle 33 causes the lever 46 to be swung counter-clockwise as viewed in Fig. 3 due to the camming action of the inserted coin upon the pin 49. Secured to the free end of the lever 46 is a link 63 which, at its upper end, is secured at 64 to a shield member 65. The shield member is of U-shape and is pivoted at 66 to a casing and comprises a pair of shield portions 65a of a size adapted to conceal the sight openings 24 when they have swung to concealing or shielding position. It will be seen that as the lever 46 is swung counter-clockwise during the initial operation of the handle 33, the shielding portions 65a will, by means of the link 63, be moved to the dotted line position shown in Fig. 1 to conceal the indicator. The shield will remain in shielding position until the handle has been operated through an arc of 180° or until the other slot 45 has been brought into registering position with the pin 49 whereupon a spring 67 moves the lever downwardly and swings the shield 65 to the inoperative position shown in full lines in Fig. 1 and dotted lines in Fig. 3. The shield not only conceals the indicator during the setting of the meter to timing relation but it constitutes an indicator also that the handle 33 has not been operated to the full extent since it is held in the concealing position until the pin 49 drops into the recess 45 and a patron therefore must operate the handle through the entire 180° stroke in order to effect the movement of the shield to the inoperative position.

The indicator shown in Figs. 7 and 8 differs from that above described only in that one side wall 68 is provided with an adjustable section 69 which may be raised or lowered by means of an adjusting screw 70 which cooperates with a slide 71 to which the section 69 is attached. By raising or lowering the section 69, the amount of material which may be carried by the receptacle can be varied. In Fig. 7, the indicator is set for holding sufficient material for a sixty-minute parking period, however, by adjusting the screw 70, the section 69 may be lowered the desired extent whereby the receptacle 68 will hold less of the material and consequently will indicate a shorter parking period. Access to the adjusting screw 70 may be had when the rear casing section 13 has been swung downwardly after releasing the lock 15.

A counter for recording the number of coins or tokens inserted in the machine may be employed conveniently with the disclosed invention. Such a counter is indicated at 72 and is arranged for actuation at each meter setting operation of the lever 33 by means of pins 73 carried in diametrically opposed relation by the disc 35 and adapted to actuate the counter indexing means in conventional manner.

The embodiment of the invention herein shown and described is simple in operation and construction and reliable in its operation since the combined timer and indicator functions uniformly to indicate a predetermined parking period or periods under varying conditions to which it is subjected in use. The shielding means which remains in the shielding position described until the indicator has been restored to its normal upright position warns the patron that he has not operated the handle through the required arc.

It will be apparent that various modifications of or changes in the structure herein shown and described may be made without departing from the scope of the invention as defined by the following claims.

I claim:

1. In a parking meter a rotatable container for mobile material, a timing receptacle therein having an open upper end and a constricted port at the lower end through which such material can flow into the container within a predetermined interval constituting a parking period, said receptacle being secured to an inner wall of the container and cooperating therewith to define a passage extending from beneath said receptacle along one side thereof and over the upper end thereof whereby upon rotation of the container and receptacle the material in the lower portion of the container is caused to flow along said passage and to be directed thereby into said open end of the receptacle, and means comprising an adjustable wall portion for said receptacle for varying the material holding capacity of said receptacle.

2. In a parking meter a rotatable container for mobile material, a timing receptacle therein having an open upper end and a constricted port at the lower end through which such material can flow into the container within a predetermined interval constituting a parking period, said receptacle being secured to an inner wall of the container and cooperating therewith to define a passage extending from beneath said receptacle along one side thereof and over the upper end thereof whereby upon rotation of the container and receptacle the material in the lower portion of the container is caused to flow along said passage and to be directed thereby into said open end of the receptacle, and means comprising an adjustable wall portion for said receptacle for varying the material holding capacity of said receptacle, said adjustable means comprising a member extending to and being manually operable from the exterior of said container.

DAVID C. ROCKOLA.